United States Patent [19]

Takeyama

[11] Patent Number: 4,869,164

[45] Date of Patent: Sep. 26, 1989

[54] TOFU MAKING APPARATUS

[75] Inventor: Kojiro Takeyama, Kawanishi, Japan

[73] Assignee: Matsushita Electric Industrial Co., Ltd., Osaka, Japan

[21] Appl. No.: 257,212

[22] Filed: Oct. 13, 1988

[51] Int. Cl.[4] .............................................. A23J 1/00
[52] U.S. Cl. ........................................ 99/483; 99/326; 99/333; 99/348; 99/353; 99/511; 366/274
[58] Field of Search ..................... 99/325–327, 99/331–333, 348, 353, 452, 453, 456, 483, 485, 486, 489, 511–513; 366/273, 54, 274, 220, 232, 234

[56] References Cited

U.S. PATENT DOCUMENTS

| | | | |
|---|---|---|---|
| 2,757,696 | 8/1956 | Billard | 99/511 |
| 3,641,917 | 2/1972 | Vallee | 99/484 X |
| 4,175,482 | 11/1979 | Kumagaya | 99/516 X |
| 4,245,553 | 1/1981 | Kanamura | 99/628 |
| 4,534,283 | 8/1985 | Nakamuta | 99/486 |
| 4,681,031 | 7/1987 | Austad | 99/513 X |
| 4,771,681 | 9/1988 | Nagata et al. | 99/483 |
| 4,802,407 | 2/1989 | Negri et al. | 99/348 |

Primary Examiner—Timothy F. Simone
Attorney, Agent, or Firm—Wenderoth, Lind & Ponack

[57] ABSTRACT

A tofu making apparatus according to the present invention is designed for small business or for domestic use.

The tofu making apparatus can automatically and consecutively produce uniform tofu in a simplified manner since such important factors for successful tofu as the boiling time period and the boiling temperature of the raw bean juice, the squeezing time period of the bean juice, the mixing time period with the coagulating agent, etc. can be automatically and stably controlled by the temperature sensor and the controller.

1 Claim, 1 Drawing Sheet

TOFU MAKING APPARATUS

BACKGROUND OF THE INVENTION

The present invention generally relates to a tofu making apparatus for use in small business or for domestic use.

A homemade tofu for small business or for domestic use has conventionally been produced in the following process: namely, (1) soybeans are soaked in water all night long, (2) the swollen soybeans are added water as much as five times the weight of the soybeans, and smashed to pieces by a mixer for about one minute to obtain raw, non-filtered bean juice (juice of raw soybeans), (3) the raw, non-filtered bean juice is put into a pan for boiling for about 15-20 minutes, (4) the boiled bean juice is squeezed by a juicer or filtered by the use of a gauze, so that the boiled bean juice is separated into bean juice and bean cakes (beancurd refuses), (5) a coagulating agent (such as calcium sulfate) is added to the bean juice which is then poured into a mold and stirred up slightly, (6) the bean juice in the mold is heated up about 70° C., and kept at that temperature for about 20 minutes until it is coagulated.

Not only because the conventional tofu making process is so complicated as described above, but because it requires careful considerations should be taken into, for example, the boiling temperature of the raw bean juice, the boiling time period or the separation technique of the raw bean juice into bean juice and bean cakes, etc., it has been quite difficult to produce tofu uniformly.

SUMMARY OF THE INVENTION

An essential object of the present invention is to provide a tofu making apparatus which is designed to automatically and uniformly produce tofu in more simple manner without complicated proceedings.

A tofu making apparatus according to the present invention is comprised of a cylindrical pan for boiling raw bean juice which is obtained by smashing raw soybeans after having been soaked in water or by adding water to powders of raw soybeans, a heater for heating the pan, a driving means for rotating the pan, a filter member for filtering the bean juice (mixed juice of bean juice and bean cakes) centrifugally squeezed during the rotation of the pan, and an outer tank provided in the outer periphery of the pan so as to receive the centrifugally-squeezed bean juice, and a mold placed at an outlet of the outer tank and provided with a stirring blade. The tofu making apparatus of the above-described construction is so arranged as to control the boiling time of the raw bean juice, the centrifugal squeezing time of the pan and the stirring time of the bean juice in the mold by the use of a temperature sensor and a controller.

In the aforementioned structure, according to the tofu making apparatus of the present invention, after the raw bean juice in the pan of the apparatus is heated and boiled by the heater for approximately 15-20 minutes, the pan is rotated at high speeds for about 15 seconds, so that the raw bean juice is separated into bean juice and beancurd refuses. Thereafter, the bean juice is poured into the mold in which a proper amount of coagulating agent is added, and then stirred slightly. After the stirring, the bean juice is left to radiate heat for 20 minutes or so. Thus, the bean juice is coagulated and molded into tofu. The tofu is taken out of the mold.

In other words, according to the tofu making apparatus of the present invention, a sequence of complicated tofu making process, namely, the earlier-described (3)-(5) proceedings can be automatically carried out.

BRIEF DESCRIPTION OF THE DRAWINGS

This and other objects and features of the present invention will be apparent from the following description taken in conjunction with one preferred embodiment thereof with reference to the accompanying drawings, in which.

DESCRIPTION OF THE PREFERRED EMBODIMENT

Figure 1:
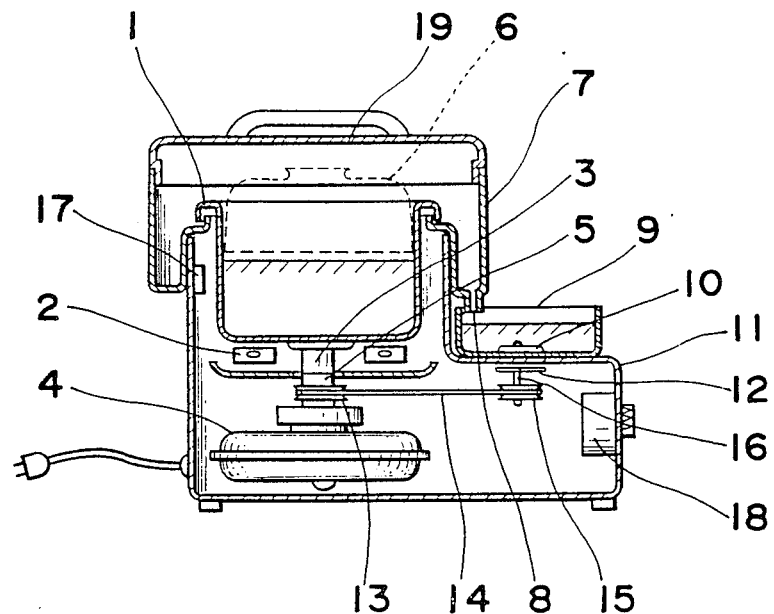
FIG. 1 is a cross sectional view of a tofu making apparatus according to one preferred embodiment of the present invention.

Before the description of the present invention proceeds, it is to be noted here that like parts are designated by like reference numerals throughout the accompanying drawings.

Figure 2:
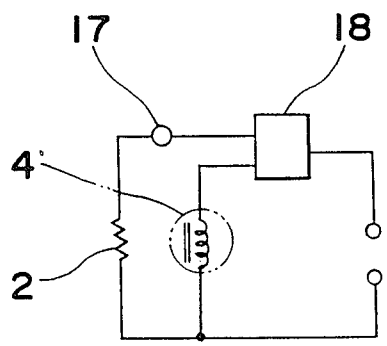
FIG. 2 is an electric circuit diagram of the apparatus of FIG. 1.

Referring to FIGS. 1 and 2, a tofu making apparatus according to the present invention has a cylindrical pan 1 for boiling raw bean juice and a heater 2 provided in the vicinity of the outside bottom of the pan 1, so that the pan 1 is heated by the heater 2. As shown in FIG. 1, a rotary shaft 3 is fixed on the center line of the bottom of the pan 1 in such manner as to project outwards. A driving shaft 5 for rotating a motor 4 is detachably fitted in the rotary shaft 3. Accordingly, when the motor 4 is rotated, the pan 1 is rotated through the driving shaft 5 and the rotary shaft 3. Further, a meshwork filter covering 6 is detachably fitted in the pan 1 so as to cover the pan 1. An outer tank 7 is provided in the outer periphery of the pan 1 which receives the bean juice squeezed by the centrifugal force.

In addition, there is placed a mold 9 below an outlet 8 formed at the bottom of the outer tank 7. A small rod 10 of magnet is provided at the bottom of the mold 9. Moreover, a rotary magnet 12 is also provided corresponding to the magnetic small rod 10 below a stand 11 on which the mold 9 is mounted. The rotary magnet 12 is rotated by the motor 4 through the driving shaft 5, a pulley 13, a belt 14, a pulley 15 and a shaft 16.

The tofu making apparatus further includes a thermostat or a temperature sensor 17 for controlling temperatures, and also a controller 18 which automatically controls the boiling time, the squeezing timing of the bean juice, the operation time, etc. An upper opening of the outer tank 7 is covered with a lid 19.

The operation of the tofu making apparatus having the above-described construction will be explained hereinbelow.

Swollen soybeans which have been soaked in water all night long are added water as much as five times the weight of the soybeans, and smashed by a mixer for about one minute to obtain raw bean juice or powders of raw soybeans. Then, the raw bean juice or the powders of the raw soybeans are further added water as much as approximately six times the weight. The water-added raw bean juice is put into the pan 1 and the filter covering 6 is placed over the pan 1. At this time, the controller 18 is switched on. Accordingly, the raw bean juice in the pan 1 is heated and boiled by the heater 2 for about 15-20 minutes. Consequently, soybean protein in the raw bean juice is dissolved and the raw bean juice is resulted in a mixture of bean juice and beancurd refuses.

Immediately when the heater 2 is stopped boiling, the controller 18 is automatically switched, and accordingly the motor 4 is rotated for a given time period (about 15 seconds) to centrifugally squeeze the mixture in the pan 1. The bean juice is extracted out into the outer tank 7 through the filter covering 6 to be poured into the mold 9 through the outlet 8. In this case, since a predetermined amount of coagulating agent such as calcium sulfate or the like is put in the mold 9 in advance, the bean juice poured into the mold 9 is stirred together with the coagulating agent for about 15 seconds by the magnetic small rod 10 which is rotated because of the magnetism of the rotary magnet 12 rotating concurrently with the rotation of the motor 4. Thereafter, the rotation is stopped.

The bean juice mixed with the coagulating agent in the mold 9 is kept at approximately 80° C. at this time point. Therefore, after the bean juice is left under the above-described condition for about 20 minutes, the mixed bean juice is coagulated to become tofu. The coagulated tofu is taken out of the mold 9 into the water. Thus, the tofu is ready for eating.

After the tofu is produced, the tofu making apparatus will be prepared for the next operation in the following manner. That is, the lid 19 is taken off. Since the rotary shaft 3 and the driving shaft 5 are detachably fitted in the pan 1 although they are restricted in movement in the rotating direction, the pan 1 can be removed upwards, and the filter covering 6 is taken off. At this time, beancurd refuses attached to the inside face of the filter covering 6 can be removed and put into a different container or a bowl for eating. Next, the outer tank 7 is also removed. Thereafter, all of these pan 1, filter covering 6, outer tank 7 and mold 9 are cleaned.

According to the above-described embodiment, the motor 4 for rotating the pan 1 is placed directly below the pan 1. However, the motor 4 may be placed at a different position, and the rotary shaft 3 of the pan 1 may be driven by a belt. Moreover, instead of the magnetic small rod 10 provided in the bottom of the mold 9, a small rotating blade for stirring the bean juice may be employed. Further, the filter covering 6 may be formed in a longitudinally large cylindrical shape.

As is clear from the foregoing description, according to the tofu making apparatus of the present invention, the complicated process of making tofu can be simplified. Tofu can be produced automatically and consecutively by the tofu making apparatus of the present invention. Moreover, since the tofu making apparatus can automatically and stably control many important factors in making tofu, namely, the boiling temperature and the boiling time period of the raw bean juice, the squeezing time period of the bean juice or the mixing time period of the bean juice with the coagulating agent, etc., tofu can be produced easily at home or for small bushiness purpose without a failure.

Although the present invention has been fully described in connection with one preferred embodiment thereof with reference to the accompanying drawings, it is to be noted that various changes and modifications are apparent to those skilled in the art. Such changes and modifications are to be understood as included within the scope of the present invention as defined by the appended claim unless they depart therefrom.

What is claimed is:

1. A tofu making apparatus comprising:
   a cylindrical pan for boiling raw bean juice which is obtained by smashing raw soybeans after having been soaked in water or by adding water to powders of raw soybeans;
   a heater for heating said pan;
   a driving means for rotating said pan;
   a filter member for filtering bean juice which is centrifugally squeezed by the rotation of the pan;
   an outer tank provided at the outer periphery of said pan so as to receive centrifugally-squeezed bean juice; and
   a mold provided at an outlet of said outer tank into which is added a coagulating agent and having a rotating blade for stirring the bean juice;
   wherein the boiling time period of the raw bean juice, the centrifugal-squeezing time period of the pan, the stirring time period of the bean juice in the mold are controlled by a temperature sensor and a controller.

* * * * *